No. 861,058. PATENTED JULY 23, 1907.
D. S. STAEBLER.
AUXILIARY CARRIAGE SEAT.
APPLICATION FILED MAY 15, 1906.
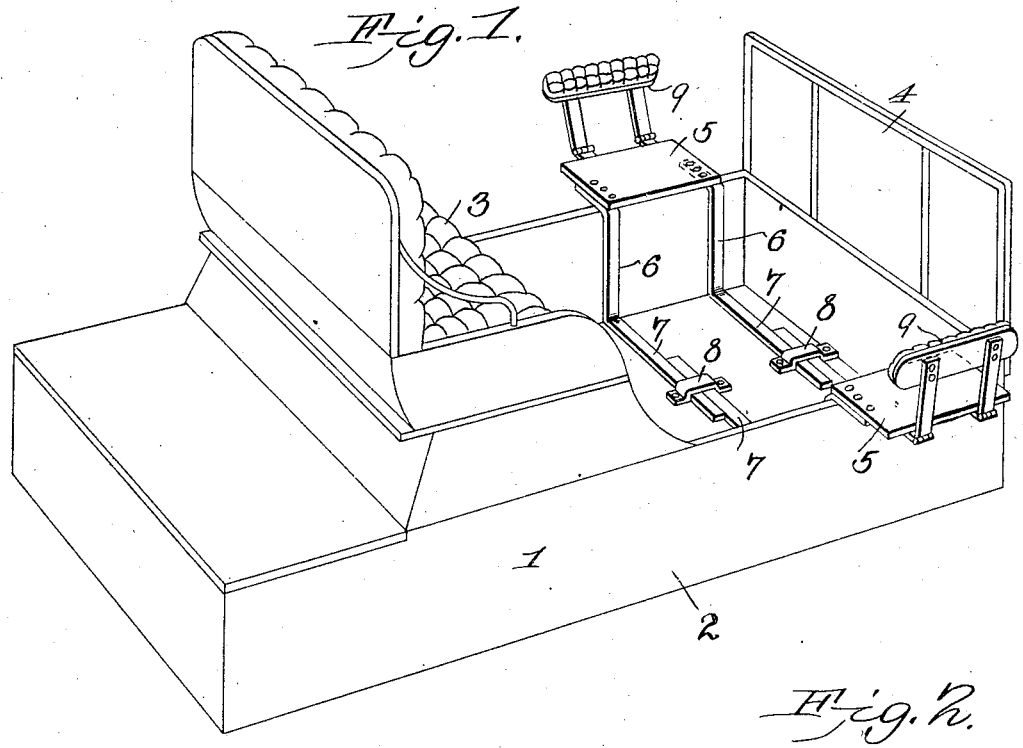
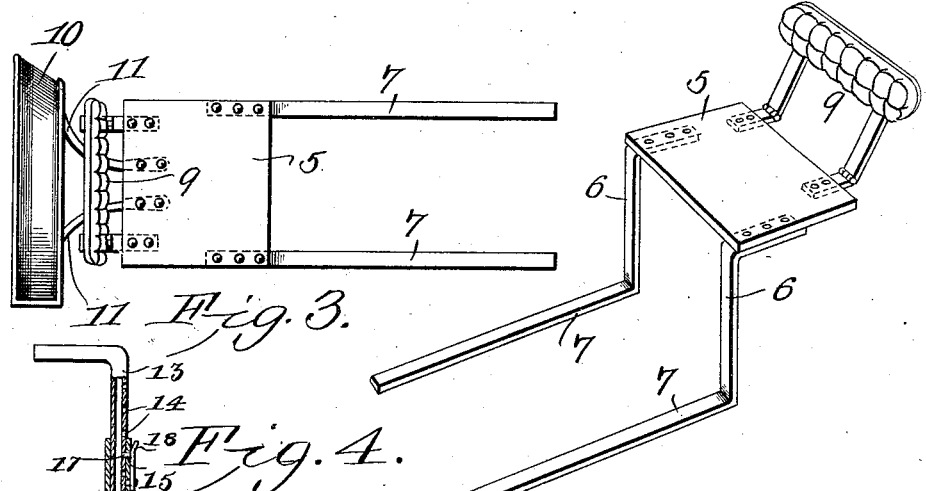
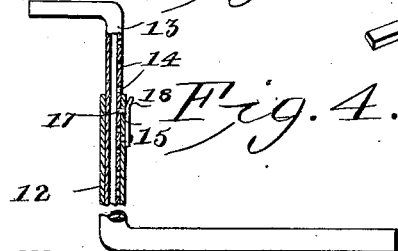
Daniel S. Staebler,
INVENTOR.
By C. A. Snow & Co
ATTORNEYS

UNITED STATES PATENT OFFICE.

DANIEL S. STAEBLER, OF SHELLROCK, IOWA.

AUXILIARY CARRIAGE-SEAT.

No. 861,058.　　　　　Specification of Letters Patent.　　　　Patented July 23, 1907.

Application filed May 15, 1906. Serial No. 317,031.

*To all whom it may concern:*

Be it known that I, DANIEL S. STAEBLER, a citizen of the United States, residing at Shellrock, in the county of Butler and State of Iowa, have invented a new and useful Auxiliary Carriage-Seat, of which the following is a specification.

The present invention relates to an improved auxiliary seat for use in connection with carriages such, for example, as a buggy, whereby the capacity can be increased to accommodate more persons, its object being to provide a seat of one or more sections which can be readily adjusted or removed, and are so constructed and arranged as to be substantial, cheap, light in weight and take up little room so that when occupied they do not inconvenience the other occupants of the carriage.

To these ends the invention consists in the details of construction and combination of parts as will be hereinafter more fully described and in the novel features set forth with particularity in the claims appended hereto.

In the accompanying drawing which illustrates one embodiment of the invention, Figure 1 is a perspective view of a buggy body with the auxiliary seat in position thereon. Fig. 2 is a perspective view of one of the seat sections. Fig. 3 is a plan view of one of the sections with a mud guard or fender in position thereon. Fig. 4 shows a modified construction of leg for the auxiliary seat, the same being partly in section and broken away.

Referring to the drawing, 1 represents the body of a buggy of the usual construction having the vertical side members 2 that support the seat 3. The auxiliary seat is arranged at the front end of the body adjacent the dash 4 thereof so as to leave ample foot space for the driver and other occupants of the carriage. The auxiliary seat is preferably made in two counterpart sections each comprising a bottom 5 supported on a pair of legs 6. The lower ends of the legs terminate in forwardly extending parallel feet 7 which are of sufficient length that when the two sections are in position in the body they overlap and thus permit of a single retainer 8 being employed to secure both sections. This retainer may be a staple, a hinged eyelet, or the like, attached to the floor of the vehicle body in a central position and the feet are somewhat longer than half the width of the body. The legs are preferably made of steel rods of suitable transverse dimensions to support the weight of the occupant, and they are bent so that the legs bear against the sides of the buggy, and the feet rest on the bottom thereof in order to be readily held in place. To the outer ends of each seat bottom 5 is hinged a folding back or rest 9. The backs, however, may be mounted on to the bottoms of the seats in any other approved manner. When the sections are in their usual position in the vehicle body, the bottoms 5 thereof project beyond the sides of the body so that the occupants thereon are exposed to the flying particles of mud when traveling over a muddy road. In order to protect the occupants on the auxiliary seat each section is provided with a mud guard or fender 10 which is supported from the seat bottom on arms 11 permanently or adjustably secured to the under side of the seat bottom.

It is to be noted that in the construction described either one or both sections of the auxiliary seat may be used at one time, and while they are by preference intended to be used in vis-a-vis relation and in the position shown in Fig. 1, they can be adjusted inwardly toward each other so as to occupy a more central position in the buggy body to protect the occupants by the top or hood of the buggy during stormy weather. Furthermore, by reason of the simple means for securing the seats in place they can be removed or applied with little trouble.

The sides 2 of various styles of buggy bodies differ as to height. In order to adapt the auxiliary buggy seats to different buggy bodies, the legs of the auxiliary seats are preferably made in two sections, as shown in the modifications, Fig. 4. The legs may be, and preferably are, composed of tubular stock, one part being of such a diameter as to fit the bore of the other part, so that the two can be assembled in telescoping relation. These parts are designated 12 and 13 in Fig. 4. The part 13 is provided with a plurality of spaced openings 14 that are adapted to be moved into register with the opening 15 in the part 12 so as to receive a locking lug 17 arranged on the spring 18. By this arrangement, the mere flexing of the spring outwardly disengages the locking lug and permits the part 13 to be raised or lowered to any desired height according to the side of the buggy body.

What I claim as new and desire to secure by Letters-Patent, is:—

1. The combination of a vehicle body, with an auxiliary seat therefor, the said seat comprising a seat bottom, legs therefor having vertical portions adapted to rest against the sides of the said body, and feet on the legs which are slidably secured to the bottom of the body.

2. The combination of a vehicle body, with an auxiliary seat therefor, the same comprising a seat bottom, legs at the front thereof, forwardly projecting feet on the legs which extend transversely to the vehicle body, and means on the bottom of the body for removably engaging said feet and arranged to permit the feet to slide horizontally therein.

3. The combination of a vehicle body, with an auxiliary seat therefor composed of counterpart sections, each section comprising a seat bottom, legs supporting the same, feet on the legs which are of greater length than half the width of the body so that the legs of both sections normally overlap, and means on the bottom of the body that engage the overlapping portion of the feet.

4. The combination of a vehicle body, with an auxiliary seat therefor composed of counterpart sections, each section comprising a seat bottom, legs supporting the same, forwardly projecting feet which are arranged to extend transversely of the vehicle body on the bottom thereof and are longer than half the width of the body, so that the feet of the two sections overlap, and means on the bottom of the vehicle which removably engage the overlapping portions of the feet for securing the sections in place and permitting them to be adjusted to different positions in the body.

5. The combination of a vehicle body, with an auxiliary seat therefor composed of counterpart sections which are arranged on the body in vis-a-vis relation to each other and adapted to overhang the sides of the body, said seat comprising a pair of legs which are adapted to bear against the inner surface of the side of the body, horizontally extending feet slidable on the bottom of the body, and a seat bottom at the upper ends of the legs which projects from the latter on the side opposite from the feet.

6. The combination of a vehicle body, with a pair of auxiliary seats, and means on the body for securing the seats in position, each seat comprising a bottom, legs therefor, and feet on the legs which slidably engage the said means, each leg being composed of sections arranged in telescoping relation for adjusting the height of the bottom.

In testimony that I claim the foregoing as my own, I have hereto affixed my signature in the presence of two witnesses.

DANIEL S. STAEBLER.

Witnesses:
H. L. WEISBARD,
Mrs. C. GREELY.